United States Patent [19]

Cheney, Jr.

[11] Patent Number: 4,545,728
[45] Date of Patent: Oct. 8, 1985

[54] WIND TURBINE GENERATOR WITH IMPROVED OPERATING SUBASSEMBLIES

[76] Inventor: Marvin C. Cheney, Jr., 24 Stonepost Rd., Glastonbury, Conn. 06033

[21] Appl. No.: 528,054

[22] Filed: Aug. 30, 1983

[51] Int. Cl.⁴ .............................................. F03D 7/04
[52] U.S. Cl. ....................................... 416/11; 416/18; 416/132 B; 416/140
[58] Field of Search ...................... 416/11, 132 B, 140, 416/18, 139 A, 9

[56] References Cited

U.S. PATENT DOCUMENTS

| | | |
|---|---|---|
| 5,122 | 5/1846 | Perkins . |
| 8,443 | 10/1851 | Perkins . |
| 109,911 | 12/1870 | Kimble . |
| 185,423 | 12/1876 | Anderson . |
| 252,835 | 1/1882 | Chamberlain . |
| 275,140 | 4/1883 | Carman . |
| 473,982 | 5/1892 | Wallace . |
| 502,528 | 8/1893 | Perry . |
| 623,402 | 4/1899 | Hong . |
| 1,038,657 | 9/1912 | Richard . |
| 1,648,837 | 11/1927 | Anderson . |
| 1,682,893 | 9/1928 | De La Cierva ................ 416/140 X |
| 2,074,952 | 3/1937 | Albers et al. . |
| 2,360,791 | 10/1944 | Putnam .................................... 416/9 |
| 2,471,681 | 5/1949 | Gluhareff .................... 416/140 A X |
| 2,609,058 | 9/1952 | Place . |
| 2,784,556 | 3/1957 | Perdue .................................... 416/9 |
| 3,265,136 | 8/1966 | Wojciechowski . |
| 3,395,761 | 8/1968 | Holzer ................................ 416/132 |
| 3,597,108 | 8/1971 | Mercer et al. .................. 416/139 A |
| 3,933,324 | 1/1976 | Ostrowski ...................... 416/169 X |
| 4,025,230 | 5/1977 | Kastan .................................... 416/18 |
| 4,083,651 | 4/1978 | Cheney et al. ........................ 416/18 |
| 4,087,202 | 5/1978 | Musgrove ............................. 416/41 |
| 4,217,501 | 8/1980 | Allison . |
| 4,297,076 | 10/1981 | Donham et al. ...................... 416/37 |
| 4,352,629 | 10/1982 | Cheney .................................. 416/18 |
| 4,363,241 | 12/1982 | Egolf .................................. 416/44 X |
| 4,366,387 | 12/1982 | Carter et al. ...................... 416/11 X |
| 4,378,198 | 3/1983 | Bettersson ...................... 416/140 R |
| 4,431,375 | 2/1984 | Carter et al. .......................... 416/11 |
| 4,435,647 | 3/1984 | Harner et al. .................... 416/41 A |

FOREIGN PATENT DOCUMENTS

| | | | |
|---|---|---|---|
| 2715584 | 10/1978 | Fed. Rep. of Germany ... 416/41 A |
| 7707210 | 11/1978 | Sweden ................................. 416/11 |
| 732572 | 5/1980 | U.S.S.R. .......................... 416/140 R |

Primary Examiner—Everette A. Powell, Jr.

[57] ABSTRACT

A wind turbine includes a yaw spring return assembly to return the nacelle from a position to which it has been rotated by yawing forces, thus preventing excessive twisting of the power cables and control cables. It also includes negative coning restrainers to limit the bending of the flexible arms of the rotor towards the tower, and stop means on the rotor shaft to orient the blades in a vertical position during periods when the unit is upwind when the wind commences. A pendulum pitch control mechanism is improved by orienting the pivot axis for the pendulum arm at an angle to the longitudinal axis of its support arm, and excessive creep is of the synthetic resin flexible beam support for the blades is prevented by a restraining cable which limits the extent of pivoting of the pendulum during normal operation but which will permit further pivoting under abnormal conditions to cause the rotor to stall.

17 Claims, 8 Drawing Figures

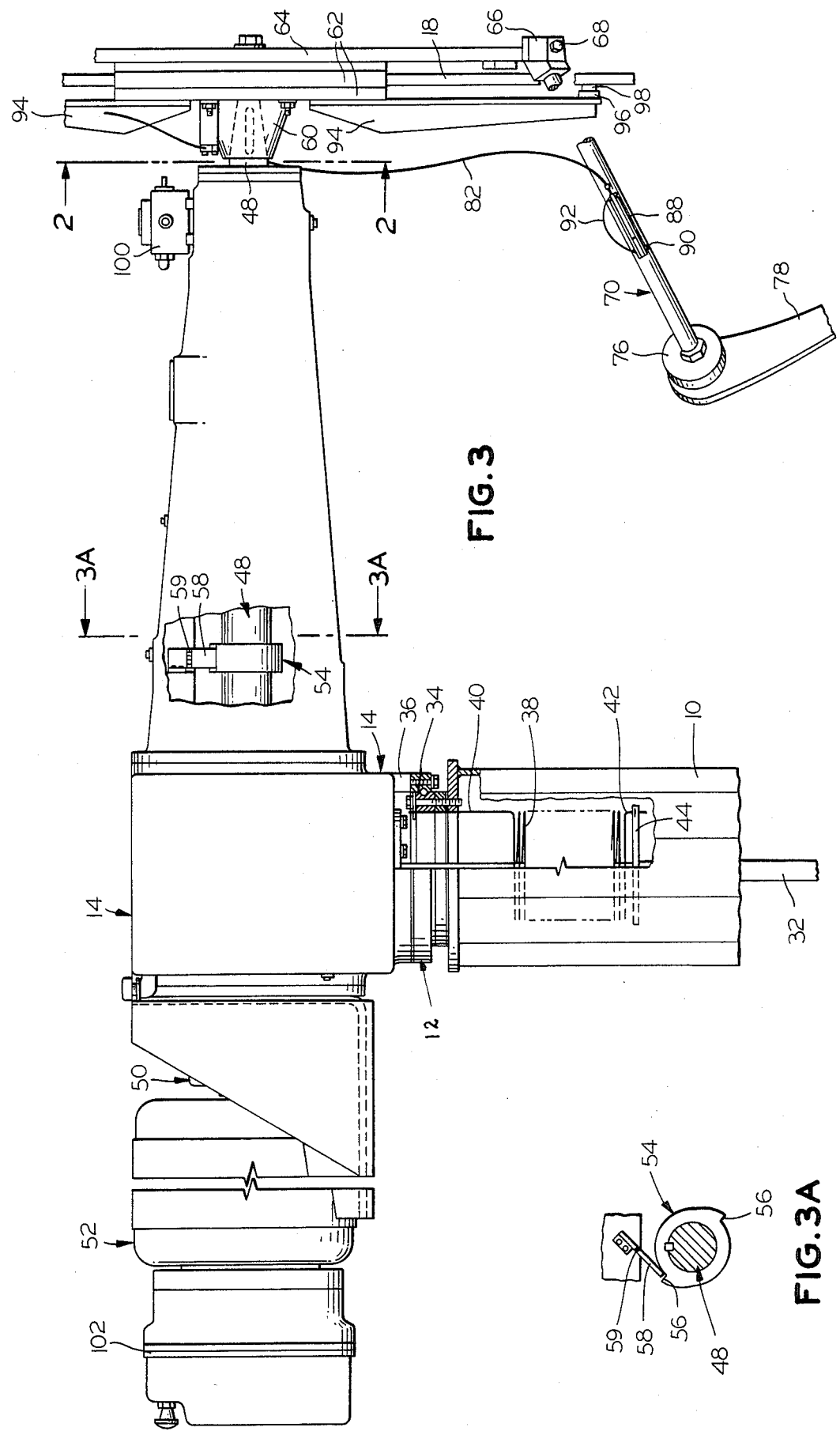

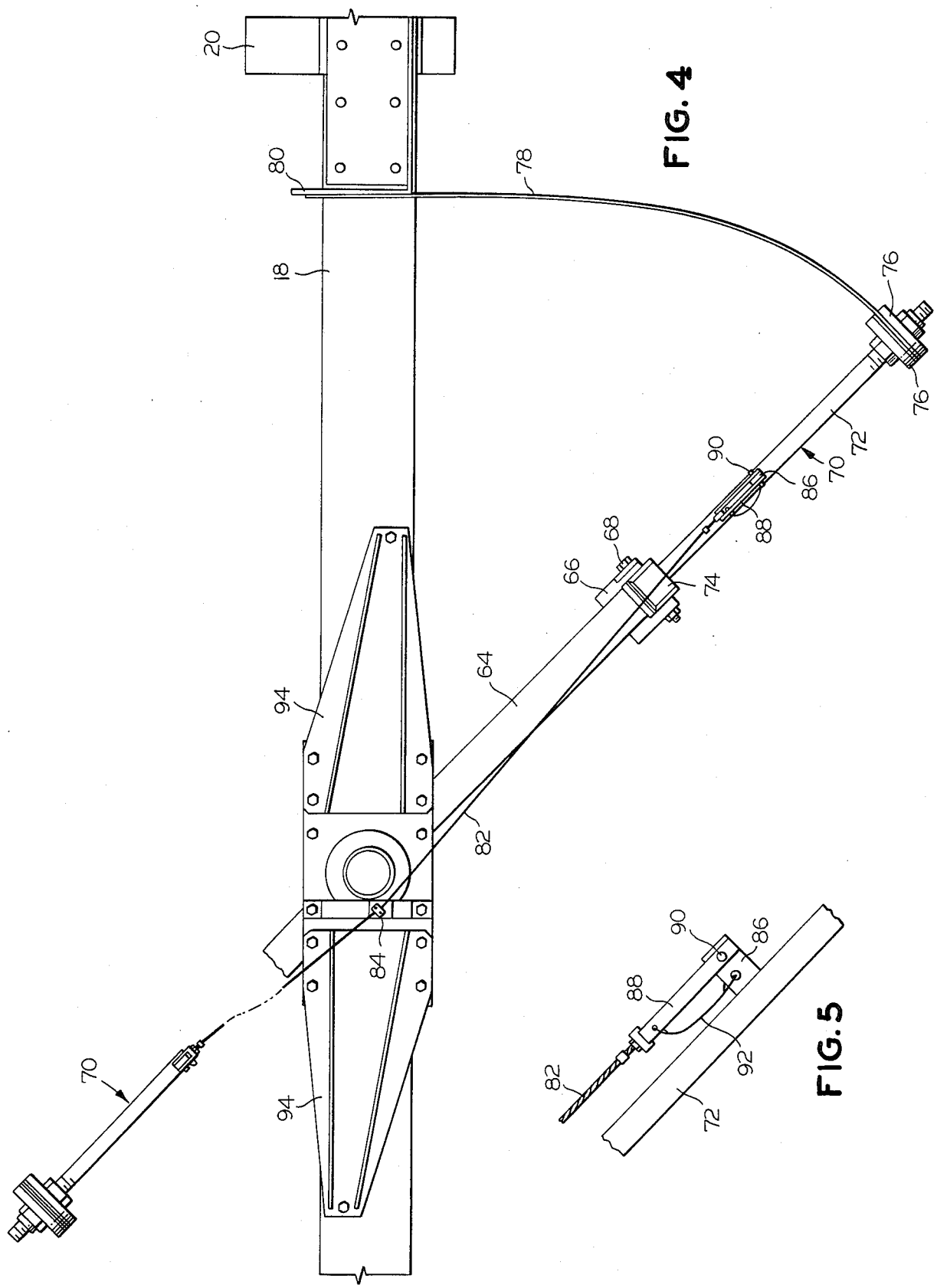

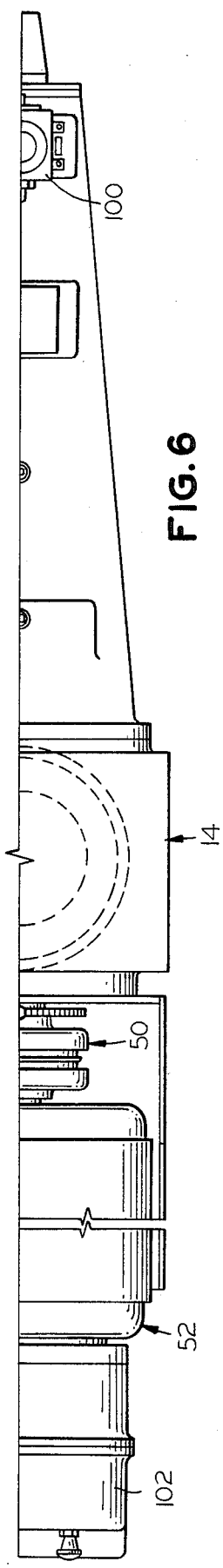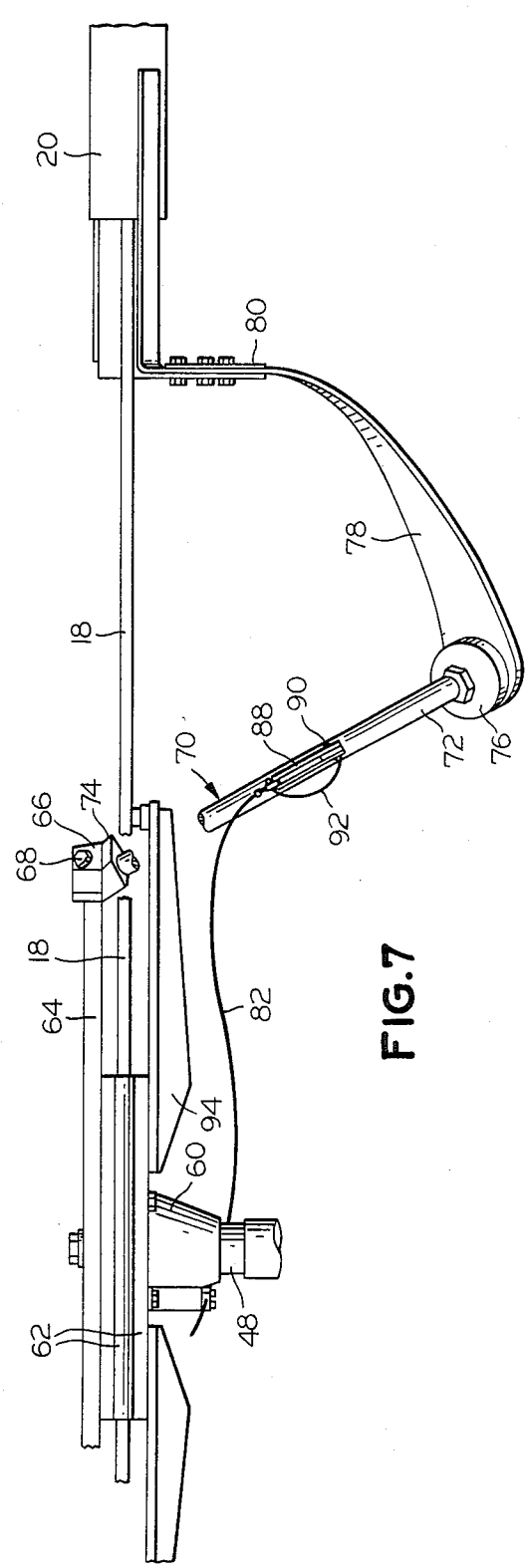

WIND TURBINE GENERATOR WITH IMPROVED OPERATING SUBASSEMBLIES

The development described and claimed herein relating to a backstop on the rotor shaft to position the rotor blades in a vertical position was made in the course of or under a subcontract with the United States Department of Energy.

The Government has rights in the invention designated as a rotor backstop assmbly to augment the static stability of the rotor as defined in claims 11–14, pursuant to Contract No. DE-AC04-76DP03533 awarded by the U.S. Department of Energy.

BACKGROUND OF THE INVENTION

The present invention relates to wind turbines and more particularly to a wind turbine of the type which is fabricated with a rotor operable about a horizontal axis and including a flexible beam member and blades supported at the opposite ends thereof and which is adapted to yaw about a vertical axis.

Efforts to reduce dependence upon fossil fuels has led to increasing demand for efficient and relatively rugged wind turbines which will provide substantial electric power in areas where the prevailing winds are sufficient to effect operation of the wind turbines over substantial periods of time. The wind turbines which are achieving most widespread utilization at the present time utilize a horizontal axis for rotation of the rotor and provide some means to permit or to drive the nacelle or power unit to rotate around a vertical axis so as to permit the assembly to yaw into a downwind position for optimum operation. In permitting or causing the yawing of the assembly to take place, there is a tendency to cause the power cables and control cables within the supporting structure to twist and this may, if unrestrained, cause these cables ultimately to fail. In an effort to eliminate this problem, slip rings have been utilized in some turbine structures at the top of the tower to permit rotation of the elements of the assembly without causing twisting of the wires. Such slip ring assemblies are fairly costly to install and require substantial maintenance. In still other assemblies, separate drive and control means have been used to vary the yaw angle of the rotor assembly with high initial cost and maintenance factors.

In many of the modern wind turbines, it is common to employ a flexible beam to the ends of which the rotor blades are secured and to allow the blades to twist about their longitudinal axis so that a change in pitch can be effected as the rotational speed increases. In an effort to provide relatively light weight rotors and the desired flexibility of the rotor blades to permit torsional forces to effect twisting of the blades and thereby pitch control, fiber reinforced synthetic resins are widely employed in the fabrication of the flexible beam and of the blades. Because of the flexural characteristics of these rotors, there is a tendency for the blades to cone or bend in the direction of the supporting tower in the event that the assembly is in the upwind position or in the event that wind forces are sufficiently gusty so as to cause flapping or bending of the blades out of the plane of rotation and towards the tower. If the blades were to strike the tower, this could result in severe damage to the wind turbine itself.

A further problem that is encountered with downwind turbines is that, when the blades are disposed at an angle to the vertical, there is low or negative static stability in an upwind position so that the rotor cannot rotate about its vertical axis to the necessary downwind position. It is therefore desirable to provide means for rotating the blades into a vertical position so that they will produce positive static stability and readily commence yaw rotation to the downwind position for startup. To provide means for effecting such orientation of the blades, various control mechanisms and independent drive mechanisms have been suggested to rotate the blades into the vertical position. Obviously such control mechanisms and independent drive mechanisms to effect the vertical orientation of the blades in the static stability condition involve added cost and maintenance factors.

In some wind turbines, there has been provided a pendulum mechanism to effect twisting of the flexible rotor blades in response to increasing rotational speed in order to maintain the blade pitch angle at approximately 0° throughout the designed operating range of the wind turbine. Such apparatus is disclosed in Applicant's U.S. Pat. Nos. 4,352,629 granted Oct. 5, 1982, and 4,083,651 granted Apr. 11, 1978. In using the type of mechanism described therein, problems have been experienced with respect to creep or permanent set induced in the synthetic plastic flexible beams which are customarily employed, which set alters the design characteristics of the rotor and results in less efficiency of the system. Moreover, additional problems have been encountered due to the high forces exerted on the pivot point for the pendulum arm causing frequent repair and replacement of all or portions of the assembly.

It is an object of the present invention to provide a novel wind turbine having improved operating mechanisms to minimize the aforesaid problems.

It is a specific object to provide such a wind turbine in which there is provided improved pitch control means for the blade, which means is relatively rugged and long-lived in operation and which will minimize the tendency for the rotor structure to exhibit excessive creep.

Another specific object of the present invention is to provide such a wind turbine in which there is included simple and relatively rugged means for orienting the blades in an approximately vertical position during periods when the wind turbine is upwind as the wind commences and to avoid creating a negative static stability situation if the blades were in a horizontal position.

Still another specific object is to provide such a wind turbine wherein there is included simple, rugged and highly effective means for controlling the amount of yawing of the rotor head and reducing the tendency to produce excessive twisting of the cables and control wires extending therethrough.

SUMMARY OF THE INVENTION

It has now been found that the foregoing and related objects can be readily attained in a wind turbine which includes a tower having a passage extending downwardly therethrough, a nacelle at the top of the tower, and bearing means supporting the nacelle on the top of the tower for rotation about a vertical axis. Rotatably supported in the nacelle for rotation about a horizontal axis is a rotor shaft which has a rotor on its one end. The rotor includes flexible beam means extending diametrically from the shaft, and flexible blades supported on the outer ends of the beam means. Generator means is provided in the nacelle and is operatively driven by the rotor shaft for generating electrical power, and cable means extends downwardly from the nacelle through the passage in the tower.

Yaw spring means is provided in the tower and is operatively connected between the nacelle and tower and is tensioned by rotation of the nacelle on the tower in response to yawing caused by change in wind direction. The spring means will rotate the nacelle in the opposite direction to the untensioned position of the spring means upon termination of the wind force producing the yawing. The cable means twists in the tower during the tensioning of the spring as a result of the yawing, and untwists when the spring rotates the nacelle to the untensioned position.

Rotor backstop means in the nacelle includes stop shoulder means on the rotor shaft and stop means engageable therewith to limit movement of the rotor shaft in the direction opposite the normal direction of rotation. This positions the rotor with the blades substantially vertical during periods in which the rotor is upwind at the time wind flow commences.

Negative coning restraining means is provided on the rotor and includes relatively rigid arm members extending outwardly from the rotor shaft along the surface of the flexible beam means adjacent the nacelle. Provided at the outer end thereof is an abutment surface to limit flexure of the flexible beam means toward the nacelle.

Also provided is blade pitch control means which includes pendulum support means extending diametrically outwardly from the rotor shaft at an angle to the longitudinal axis of the flexible beam means, pendulum members pivoted at one end to the outer ends of the support means, and flexible straps connected between the other ends of the pendulum members and the flexible beam means to effect torsional twisting of the beam means during rotation of the rotor and thereby maintain the pitch angle of the blades at approximately 0° throughout the normal operating range of the turbine. The axis of the pivoting between the one end of the pendulum members and the support means is angularly offset from the plane of rotation of the support means.

Creep control means for the flexible beam means comprises cable means which extends between the pendulum members to limit the extent of pivoting thereof relative to the longitudinal axis of the pendulum support means and thereby the torsional twisting of the beam support means. Shear means connects the cable means and pendulum members for shearing the connection under excessive speed conditions of the rotor to effect further twisting of the blades and effect stalling of the rotor. In the preferred embodiment, the yaw spring means is a helical torsion spring having its ends operatively connected between the nacelle and the tower, and the cable means extends downwardly through the center of the helical spring.

The negative coning restraining means has its abutment surface oriented to the side of the longitudinal axis of the flexible beam means adjacent the leading edge of the blade affixed thereto simultaneously to pitch the blade to produce lift on the blade to resist deflection towards the tower. The coning restraining means also includes resiliently deformable snubbing means providing the abutment surface thereof.

Desirably, the stop shoulder means of the rotor backstop means is provided upon a cam secured on the rotor shaft, and the stop means engageable therewith comprises a deflectable arm secured on the nacelle and deflectable by rotation of the rotor shaft in the normal direction of rotation. The deflectable arm has a first portion secured on the nacelle and a free end portion pivoted thereto to provide deflection in the one direction of rotation of the rotor shaft and cam.

Preferably, the creep control means includes an auxiliary cable extending between the pendulum member and the cable means adjacent the connection to the pendulum member to maintain the elements in assembly in the event of shearing of the shear means. The creep control means includes bracket mounting means on the pendulum member and second mounting means at the ends of the cable means, and one of the mounting means provides a clevis. The shear means is a shear pin extending through the clevis and the other of the mounting means.

One of the support means and one end of the pendulum members of the blade pitch control means is formed as a clevis providing a pivotal axis oriented at an angle of about 5°–10° to the plane of rotation of the pendulum support means.

BRIEF DESCRIPTION OF THE DRAWINGS

FIG. 3 is a fragmentary side elevational view of the upper portion of the tower and of the nacelle assembly with portions of the nacelle housing broken away or removed and with portions of the tower broken away, so as to reveal internal construction;

FIG. 3A is a sectional view along the line 3A—3A of FIG. 3 showing the shaft stop cam and stop lever of the present invention;

FIG. 4 is a fragmentary front elevational view of the rotor of FIG. 1 drawn to a greatly enlarged scale;

FIG. 5 is a fragmentary side elevational view of the attachment of the creep control cable to a pendulum rod;

FIG. 6 is a fragmentary top view of the nacelle assembly with portions of the housing removed to reveal internal construction; and FIG. 7 is a fragmentary side elevational view of the rotor drawn to a greatly enlarged scale from that of FIG. 1.

DETAILED DESCRIPTION OF THE ILLUSTRATED EMBODIMENT

Figures 1, 2:
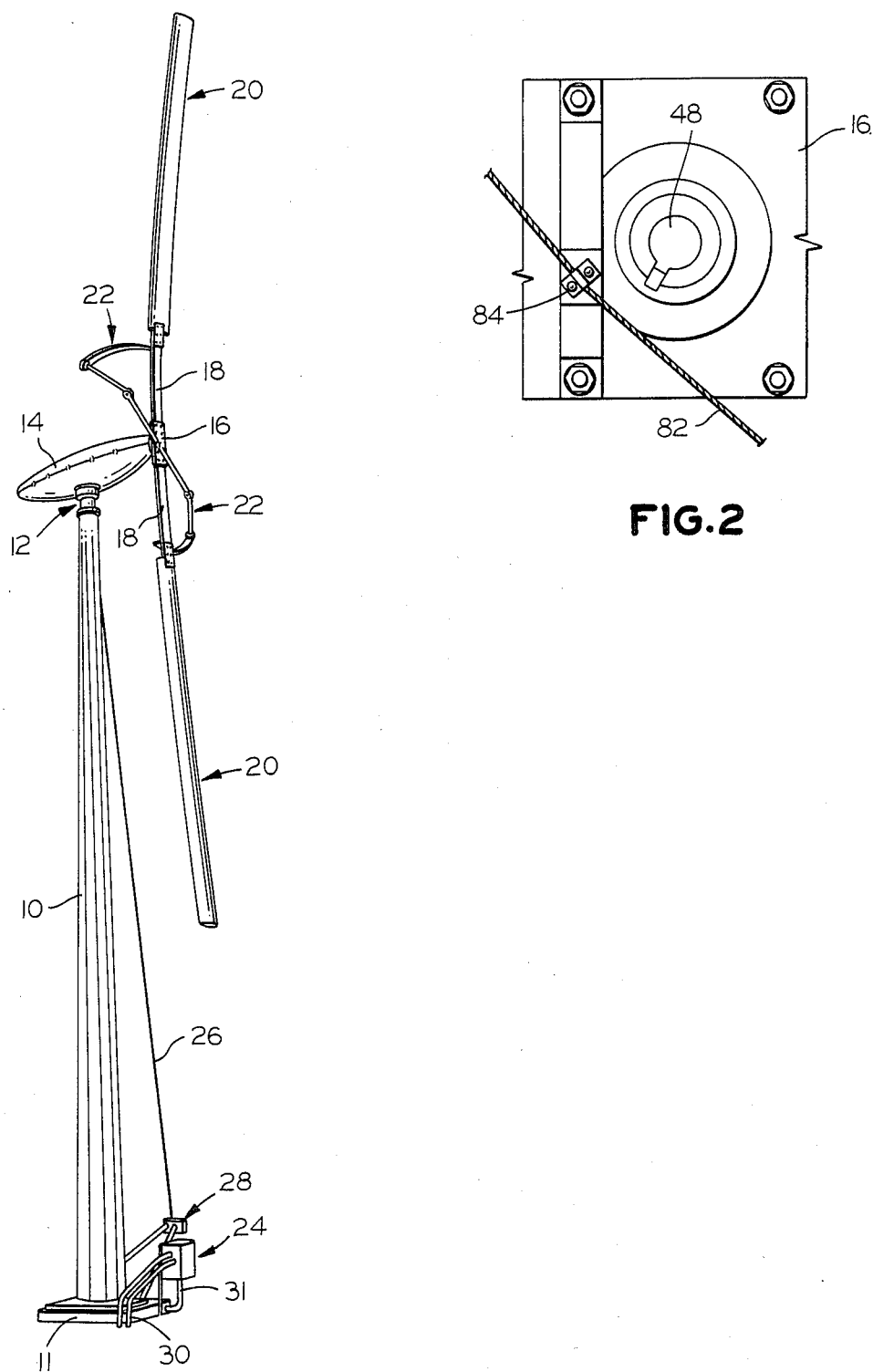
FIG. 1 is a perspective view of a wind turbine embodying the improvements of the present invention.
FIG. 2 is a fragmentary view of the wind turbine generally along the line 2—2 of FIG. 3 and drawn to an enlarged scale.

Turning first to FIG. 1 of the attached drawings, therein illustrated is a wind turbine embodying the improvements of the present invention and comprised of a tower 10, a bearing assembly generally designated by the numeral 12 and rotatable ABOUT A VERTICA AXIS on the upper end of the tower 10, and the nacelle generally designated by the numberal 14. Rotatably supported in the nacelle 14 by a horizontally disposed shaft (not shown in this figure) is the hub 16 which seats the central portion of the flexible beam generally designated by the numeral 18; the beam 18 in turn carries at its outer ends the airfoil blades generally designated by the numeral 20. Together the blades 20 and beam 18 comprise the rotor. Extending between the hub 16 and the outer end portions of the flexible beam 18 are the flexible beam control assemblies generally designated by the numeral 22.

Extending downwardly from the upper portion of the tower to the winch housing 28 is a cable 26 which permits the tower 10 to be raised and lowered about a pivot on the base 11 and which is detached and coiled about the tower 10 when not in use. At the ground level is a control and distribution unit generally designated by the numeral 24 from which conduits 30 run to the power grid (not shown) and which receives the conduit 31 containing the power transmission cables and control lines from the nacelle 14 which lines run through the hollow tower 10.

Turning now to FIG. 3, it can be seen that the bearing assembly 12 for the nacelle 14 includes an annular turntable bearing comprised of the turntable bearing base 34 affixed to the top of the tower 10 and a turntable bearing top 36 affixed to the nacelle 14 and rotatably seated over the turntable bearing base 34.

Provided in the upper end of the tower 10 is a yaw return assembly which includes a soft helical torsion spring or yaw spring 38 which is disposed in the upper end of the tower 10. The spring 38 has its upper end 40 fixed to the non-rotating turntable bearing base 34 and its lower end 42 fixed in a bracket 44 which is connected to the nacelle 14 so as to rotate therewith. When the nacelle 14 rotates on the tower 10 in response to change in wind direction, the torsion spring 38 will be tensioned by reason of its fixed end, and, when the windflow terminates in that direction, the stored tension in the spring 38 will rotate the nacelle 14 to its initial position.

Extending downwardly through the annular bearing assembly 12 and the tower 10 from the nacelle 14 are the power transmission cable and control cables 32. When the nacelle 14 rotates on the turntable base 34 in any one direction, the cables 32 will twist as necessary within the hollow core of the spring 38. Upon removal of the yawing wind force, the spring 38 will rotate the nacelle 14 and unwind the cables 32.

The nacelle 14 includes a streamlined synthetic resin housing 15 for the various components received therewithin to improve its aesthetics and its aerodynamics during windflow thereabout. The hub 16 is fixedly supported on the outer end of a horizontally disposed rotor shaft 48 which is journalled in the nacelle 14 for rotation therewithin. At its opposite end, the rotor shaft 48 is coupled by a gear and coupling assembly generally designated by the numeral 50 to the generator assembly which is generally designated by the numeral 52. Mounted in the nacelle 14 adjacent the rotor is a vibration sensor 100 which will actuate the brake 102 at the end of the generator assembly 52 and preclude further rotation of the shaft 48 and thereby the rotor.

As best seen in FIGS. 3 and 3a, intermediate the length of the rotor shaft 48 is a rotor backstop assembly which includes a cam ring generally designated by the numeral 54 which is keyed to the shaft 48 and provides a pair of diametrically spaced stop shoulders 56. Secured at one end to the frame of the nacelle 14 is an elongated hinged stop arm 58, the outer end of which will abut the face of a stop shoulder 56 to stop the rotor shaft 48 as it rotates in the reverse (clockwise) direction with the blades 20 in a vertical position when the rotor is upwind. When the rotor shaft 48 rotates in its normal counterclockwise drive direction (as seen from the rear of the nacelle 14), the surface of the cam ring 54 adjacent the shoulder will pivot the stop arm 58 about its intermediate hinge 59 to permit the shaft 48 to rotate freely.

The hub 16 includes a collar 60 splined to the rotor shaft 48 and a pair of opposed hub housing elements 62 which have a channel extending therethrough in which is seated the flexible beam 18.

Supported on the outer hub housing element 62 are the beam control assemblies 22 which comprise an improvement upon the centrifugally responsive pitch governor of the type described in detail in Applicant's prior U.S. Pat. Nos. 4,352,629 granted Oct. 5, 1982 and 4,083,651 granted Apr. 11, 1978.

As best seen in FIGS. 3–5 and 7, a pendulum support beam 64 is secured to the housing element 62 and extends outwardly therefrom diametrically of the rotor shaft 48 and hub 16. The outer ends of the support beam 64 provide a clevis 66 in which is pivotally mounted by the pivot pin 68 one end of a pendulum pitch governor generally designated by the numeral 70. The governor 70 includes an elongated rod 72 with an enlarged inner end 74 which is pivoted in the clevis 66 and a pair of disc shaped weights 76 which are secured on the outer end of the rod 72.

Extending between the weights 76 is one end of a flexible metal strap 78 which extends curvilinearly therefrom and is secured at its other end to a bracket 80 which is secured to the flexible beam 18 adjacent the blades 20.

As described in Applicant's aforementioned patents, the strap 78 is flexed by the pendulum pitch governor 70, and this in turn effects a torsional twisting of the flexible beam 18 to adjust the pitch of the blades 20. As the wind speed and rotational speed of the rotor blades 20 increase, the pendulum 70 swings towards the plane of rotation of the blades 20 to increase their pitch.

In the assembly of the present invention, the pivot pin apertures in the clevis 66 are disposed to provide a pivot axis which is skewed relative to the plane of rotation of the support beam 64 and blades 20 as previously utilized. By displacing the pivot axis about 5°–10° from this plane and in a clockwise direction when viewed from the outer end of the support beam 64, the distance between the ends of the strap 78 remains relatively constant, thus reducing the large amount of buckling force that the strip 78 would otherwise experience as the rod 72 rotated. This angle can be selected to balance the moment acting upon the pivot point, or at least reduce it, to lower the wear on the bushings which are employed thereat.

In the improved pitch control mechanism of the present invention, there is also provided means for reducing the tendency for the material (fiberglass-reinforced vinyl ester polymer) of the flexible beam 18 to creep due to the torsion or twisting of the beam 18 during operation as a result of the pendulum forces acting on it through the flexible strap 78. In this type of control mechanism, the flexible strap 78 produces twisting of the flexible beam 18 within a designed operating level. However, in operation it has been found that the synthetic resin from which the flexible beam 18 is fabricated will take a permanent set as a result of the continuing stresses produced in the resin material since it is of limited elasticity. In some instances, the static pitch angle of the flexible beam 18 and thereby of the boade 20 has varied from an initial design angle of about 10° to less than 6°. This has resulted in a significant reduction in the startup torque and thereby required a higher wind speed to start the rotor operating. Moreover, this has increased the ultimate normal operating pitch and thereby caused a reduction in performance of the generator.

In the improved assembly of the present invention, means is provided for limiting the normal amount of deflection in the flexible beam 18 to a finite level of about 20 percent or 2°. By limiting the twist angle in the flexible beam 18 during normal operation, the creep and permanent set of the resin can be substantially minimized while not excessively increasing the startup wind force. However, it is important that the flexbeam control mechanism 22 still function to allow the pendulum rods 72 to swing out far enough to effect a major change in blade pitch to cause the rotor to stall in the event of a failure in the system.

Accordingly, in the improvement of the present invention, the two pendulum rods 72 are connected by the cable 82 so as to produce simultaneous pitch changes in both blades 20, thus avoiding potential vibration problems were one blade 20 to have a different pitch than the other. The continuous cable 82 extends between the two pitch governor assemblies 70 and is secured to the hub 16 by the cable guide bracket 84. To minimize the amount of undesired creep to about 20 percent of deflection, the flexible cable 82 should limit swinging of the pendulum rod 72 to an included angle of about 30° to 40°.

During normal operation, the creep control cable 82 limits the extent to which the pendulum rod 72 of the pitch governor 70 may swing in response to the increasing speed of rotation of the rotor shaft 48.

However, the cable 82 has at each of its ends a clevis 88 which is secured to a bracket 86 on the pendulum rod 72 by a shear pin 90 of preselected strength in shear. In the event that the shear pin 90 should shear as a result of excessive speed of the rotor, a safety cable 92 extends between the clevis 88 on the cable 82 and the bracket 86 on the pendulum rod 72, and thus maintains the elements in assembly after shear pin failure. However, the pendulum rods 72 will swing sufficiently to twist the flexible beams 18 to place the rotor blades 20 in a stall condition.

In the illustrated wind turbine, there is also provided means for restraining negative coning or bending of the flexible beams 18 and blades 20 towards the tower 10 as a result of wind action and/or rotation. Such negative coning could cause the blades 20 to contact the tower 10 and produce substantial damage.

Secured to the hub housing elements 62 are a pair of elongated coning restrainers 94 which extend outwardly adjacent the flexible arm 18 to a point adjacent or to somewhat beyond the midpoint of the distance from the hub 16 to the blade 20. As best seen in FIG. 4, the outer end of the restrainer 94 is positioned to one side of the elastic or longitudinal axis of the beam 18 so as to effect a twisting moment if the two elements come into high pressure contact. The portion of the beam 18 contacted should be that disposed toward the leading edge of the blade 20 to pitch the leading edge of the blade 20 away from the tower 10 and increase lift on the blade 20.

To provide a resilient contact surface for the beam 18, the metallic coning restrainer 94 has a cup element 96 thereon providing a recess seating a resiliently deformable member 98 such as rubber, polyurethane, or the like.

It will be appreciated that the illustrated turbine is a downwind turbine, and that various of the subassemblies described and claimed herein may be modified for use on upwind turbines of the type commonly employed in Europe.

From the foregoing detailed description and attached drawings, it can be seen that the wind turbines of the present invention afford improved operating characteristics and incorporate longer lived components. The improved subassemblies may be readily fabricated without major change in existing engineering designs.

Having thus described the invention, I claim:

1. In a wind turbine, the combination comprising:
    A. a tower having a passage extending downwardly therethrough;
    B. a nacelle at the top of said tower;
    C. bearing means supporting said nacelle on the top of said tower for rotation about a vertical axis;
    D. a rotor shaft rotatably supported in said nacelle for rotation about a horizontal axis;
    E. a rotor on one end of said rotor shaft and including flexible beam means extending diametrically from said shaft, and flexible blades supported on the outer ends of said beam means;
    F. generator means in said nacelle operatively driven by said rotor shaft for generating electrical power;
    G. cable means extending downwardly from said nacelle through said passage in said tower;
    H. yaw spring means in said tower operatively connected between said nacelle and tower and tensioned by rotation of said nacelle on said tower in response to yawing caused by change in wind direction, said spring means limiting the rotation of said nacelle in one direction and rotating said nacelle in the opposite direction to the untensioned position of said spring means upon termination of the wind force producing the yawing, said cable means twisting in said tower during said tensioning of said spring as a result of said yawing;
    I. rotor backstop means in said nacelle including stop shoulder means on said rotor shaft and stop means engageable therewith to limit movement of the rotor shaft in the direction opposite the normal direction of rotation and thereby position said rotor with the blades substantially vertical during periods in which said rotor is upwind at the time wind flow commences;
    J. negative coning restraining means on said rotor including relatively rigid arm members extending outwardly from said rotor shaft along the surface of said flexible beam means adjacent said nacelle and providing at the outer end thereof an abutment surface to limit flexure of said flexible beam means toward said nacelle;
    K. blade pitch control means including pendulum support means extending diametrically outwardly from said rotor shaft at an angle to the longitudinal axis of said flexible beam means, pendulum members pivoted at one end to the outer ends of said support means, and flexible straps connected between the other ends of said pendulum members and said flexible beam means to effect torsional twisting of said beam means during rotation of said rotor and thereby maintain the pitch angle of said blades at approximately 0° throughout the normal operating range of the turbine, the axis of the pivoting between said one end of said pendulum members and said support means being angularly offset from the plane of rotation of said support means; and
    L. creep control means for said flexible beam means comprising cable means extending between said pendulum members to limit the extent of pivoting thereof relative to the longitudinal axes of said pendulum support means and thereby the torsional twisting of said beam support means and shear means connecting said cable means and pendulum members for shearing said connection under excessive speed conditions of said rotor to effect further twisting of said blades and effect stalling of said rotor.

2. The wind turbine of claim 1 wherein said yaw spring means is a helical torsion spring having its ends operative between said nacelle and said tower.

3. The wind turbine of claim 2 wherein said cable means extends downwardly through the center of said helical spring.

4. The wind turbine of claim 1 wherein said negative coning restraining means has its abutment surface oriented to the side of the longitudinal axis of the flexible beam means adjacent the leading edge of said blade affixed thereto simultaneously to pitch said blade to produce lift on said blade to resist deflection towards said tower.

5. The wind turbine of claim 4 wherein said coning restraining means includes resiliently deformable snubbing means providing the abutment surface thereof.

6. The wind turbine of claim 1 wherein said stop shoulder means of said rotor backstop means is provided upon a cam secured on said rotor shaft and wherein said stop means engageable therewith comprises a deflectable arm secured on said nacelle and deflectable by rotation of said rotor shaft in the normal direction of rotation.

7. The wind turbine of claim 6 wherein said deflectable arm has a first portion secured on said nacelle and a free end portion pivoted thereto to provide deflection in the one direction of rotation of said rotor shaft and cam.

8. The wind turbine of claim 1 wherein said creep control means includes an auxiliary cable extending between said pendulum member and said cable means adjacent the connection to said pendulum member to maintain the elements in assembly in the event of shearing of said shear means.

9. The wind turbine of claim 1 wherein said creep control means includes bracket mounting means on said pendulum member and second mounting means at the ends of said cable means, one of said mounting means providing a clevis, and wherein said shear means comprises a shear pin extending through said clevis and the other of said mounting means.

10. The wind turbine of claim 1 wherein one of said support means and one end of said pendulum members of said blade pitch control means is formed as a clevis providing a pivotal axis oriented at an angle of about 5°–10° to the plane of rotation of said pendulum support means.

11. In a wind turbine, the combination comprising:
A. a tower having a passage extending downwardly therethrough;
B. a nacelle at the top of said tower;
C. bearing means supporting said nacelle on the top of said tower for rotation about a vertical axis;
D. a rotor shaft rotatably supported in said nacelle for rotation about a horizontal axis;
E. a rotor on one end of said rotor shaft; and
F. rotor backstop means in said nacelle including stop shoulder means on said rotor shaft and stop means engageable therewith to limit movement of the rotor shaft in the direction opposite the normal direction of rotation and thereby position said rotor with the blades in a predetermined substantially vertical position during periods in which said rotor is upwind at the time wind flow commences.

12. The wind turbine of claim 11 wherein a pair of diametrically spaced stop shoulder means are provided upon a cam secured on said rotor shaft.

13. The wind turbine of claim 12 wherein said stop means comprise a deflectable arm, said arm being deflectable by said cam during rotation of said rotor shaft in the normal direction of rotation.

14. The wind turbine of claim 13 wherein said deflectable arm has a first portion secured on said nacelle and a free end portion pivoted thereto to provide deflection in the normal direction of rotation of said rotor shaft and cam.

15. In a wind turbine, the combination comprising:
A. a tower having a passage extending downwardly therethrough;
B. a nacelle at the top of said tower;
C. bearing means supporting said nacelle on the top of said tower for rotation about a vertical axis;
D. a rotor shaft rotatably supported in said nacelle for rotation about a horizontal axis;
E. a rotor on one end of said rotor shaft and including flexible beam means extending diametrically from said shaft, and flexible blades supported on the outer ends of said beam means;
F. blade pitch control means including pendulum support means extending diametrically outwardly from said rotor shaft at an angle to the longitudinal axis of said flexible beam means, pendulum members pivoted at one end to the outer ends of said support means, and flexible straps connected between the other ends of said pendulum members and said flexible beam means to effect torsional twisting of said beam means during rotation of said rotor and thereby maintain the pitch angle of said blades at approximately 0° throughout the normal operating range of the turbine; and
G. creep control means for said flexible beam means comprising cable means extending between said pendulum members to limit the extent of pivoting thereof relative to the longitudinal axes of said pendulum support means and thereby the torsional twisting of said beam support means and shear means connecting said cable means and pendulum members for shearing said connection under excessive speed conditions of said rotor to effect further twisting of said blades and effect stalling of said rotor.

16. The wind turbine of claim 15 wherein said creep control means includes an auxiliary cable extending between said pendulum member and said cable means adjacent the connection to said pendulum member to maintain the elements in assembly in the event of shearing of said shear means.

17. The wind turbine of claim 15 wherein said creep control means includes bracket mounting means on said pendulum member and second mounting means at the ends of said cable means, one of said mounting means providing a clevis, and wherein said shear means comprises a shear pin extending through said clevis and the other of said mounting means.

* * * * *